March 3, 1970    D. KLUMP ET AL    3,498,465
SEWAGE CLARIFIER SYSTEM OR THE LIKE
Filed Feb. 7, 1968    4 Sheets-Sheet 3

INVENTOR.
DIETER KLUMP
LEONHARD E. FECHTER
BY

INVENTOR.
DIETER KLUMP.
LEONHARD E. FECHTER
BY Herald A. Mathew
Agent

United States Patent Office 3,498,465
Patented Mar. 3, 1970

3,498,465
SEWAGE CLARIFIER SYSTEM OR THE LIKE
Dieter Klump, Michelbach, Nassau, and Leonhard Emil Fechter, Michelbacherhutte, Germany, assignors to Passavant-Werke Michelbach, Nassau, Germany, a corporation of Germany
Filed Feb. 7, 1968, Ser. No. 703,620
Claims priority, application Germany, Feb. 17, 1967, P 41,440
Int. Cl. B01d 43/00, 12/00
U.S. Cl. 210—525    9 Claims

ABSTRACT OF THE DISCLOSURE

A bridge-type clarification system includes improved means for raising and lowering a sludge collector member supported by a movable bridge structure and control means for positively coordinating the direction of movement of the bridge structure with the vertical position of the collector member.

BACKGROUND OF THE INVENTION

Field of the invention

The present invention relates generally to the treatment of sewage or the like and more particularly to clarification tank systems employed to effect separation of liquids and solids in sewage treatment installations. Still more particularly, the invention concerns improvements in means for supporting and operating sludge scrapers and related elements incorporated in bridge-type clarification tank systems.

Description of the prior art

A clarification tank system of the type to which the present invention relates comprises a horizontal elongate rectangular tank or basin in which separation of liquids and solids in sewage is achieved through quiescent settling of suspended solids to the floor of the tank, where such solids accumulate to form a layer of sludge. To dispose of this sludge, a sludge collector blade periodically scrapes it along the tank floor into a sludge trough or sludge well, from which it is removed for further drying and processing.

In a so-called bridge-type clarification tank system, the sludge collector structure comprises a movable bridge spanning the tank between its opposite side walls and supporting a sludge collector blade, which is thereby reciprocated longitudinally along the tank by corresponding movement of the bridge. As the bridge moves forwardly toward the end of the tank provided with the sludge well, the sludge collector blade is dragged along the tank floor to move the accumulated sludge along the floor and into the sludge well. During the opposite rearward movement of the bridge back to the other end of the tank, however, the scraper is raised to prevent disturbing the accumulating sludge layer.

In previous constructions of this general type, it is well known to effect continuous back and forth movement of the bridge between the opposite ends of the tank by automatically reversing the direction of movement of the bridge whenever it reaches a predetermined location adjacent the corresponding end of the tank. Also, it is known to provide such an arrangement with means for raising the blade and latching it in a raised position upon arrival of the bridge at the sludge well end of the tank; and for releasing the blade for downward movement in response to the completion of the rearward movement of the bridge. However, in such prior art constructions, the means employed for reversing the direction of movement of the bridge and the means by which the blade is raised and lowered have been independent of one another to the extent that the movement of the bridge is not positively correlated with the position of the blade or vice versa. For example, if the blade should fail to return to its lowered position, the bridge nevertheless continues to move back and forth along the tank without performing its sludge collecting function. Similarly, if the blade lifting mechanism fails to raise the blade or to maintain it in its raised position throughout the rearward movement of the bridge, the accumulated sludge will be pushed to the wrong end of the tank, where it is inaccessible to the blade for subsequent movement to the sludge well. Moreover, the latter type of malfunction is very likely to damage the blade or its supporting structure or both inasmuch as the blade will be pushed along the tank bottom, rather than dragged, and is therefore incapable of riding over immovable obstructions or over irregularities in the internal tank surfaces.

SUMMARY OF THE INVENTION

The principal objective of the present invention is to overcome the aforementioned disadvantages of presently known bridge-type sludge collectors, this objective being accomplished by minimizing the possibility of malfunctioning of the blade positioning mechanism and by positively coordinating the direction of movement of the bridge with the position of the sludge collector blade.

More specifically, in accordance with the present invention the blade is raised and lowered upon arrival at the respective ends of the tank by simple and reliable mechanical means actuated by the movement of the bridge, such means being substantially invulnerable to malfunctioning occasioned by the corrosive and sedimentary environment in which the blade and its supporting structure must operate. These same means employed to position and support the scraper blade can also be adapted conveniently to operate a skimmer device which is raised and lowered in a similar manner to remove scum from the surface of the liquid and deposit it in a corresponding scum trough at one end of the tank. Additionally, the switch device or the like utilized to control the direction of movement of the bridge is actuated preferably by the collector blade support structure so that the bridge can move forwardly only while the blade is lowered and rearwardly only so long as the blade is raised. Thus, if a malfunction should occur in the operation of the blade positioning mechanism, the direction of movement of the bridge is still coordinated with the blade position to prevent damage to the unit. For example, if the blade should accidentally be lowered during rearward movement of the bridge, the bridge would immediately be reversed, thereby reducing the area of effective operation of the blade but avoiding damage to the unit. Also, any such malfunction would be apparent by visual observation of the movement of the bridge, whereas in prior art arrangements the bridge can continue to reciprocate in its normal manner even through the blade may be improperly positioned.

Various means for practicing the invention and other features and advantages thereof will be apparent from the following description of illustrative preferred embodiments thereof, read in connection with the accompanying drawings.

BRIEF DESCRIPTION OF THE DRAWINGS

The accompanying drawings are all of somewhat schematic nature, with like reference numerals referring to like elements.

In the drawings.

DESCRIPTION OF ILLUSTRATIVE PREFERRED EMBODIMENTS

Figure 1:
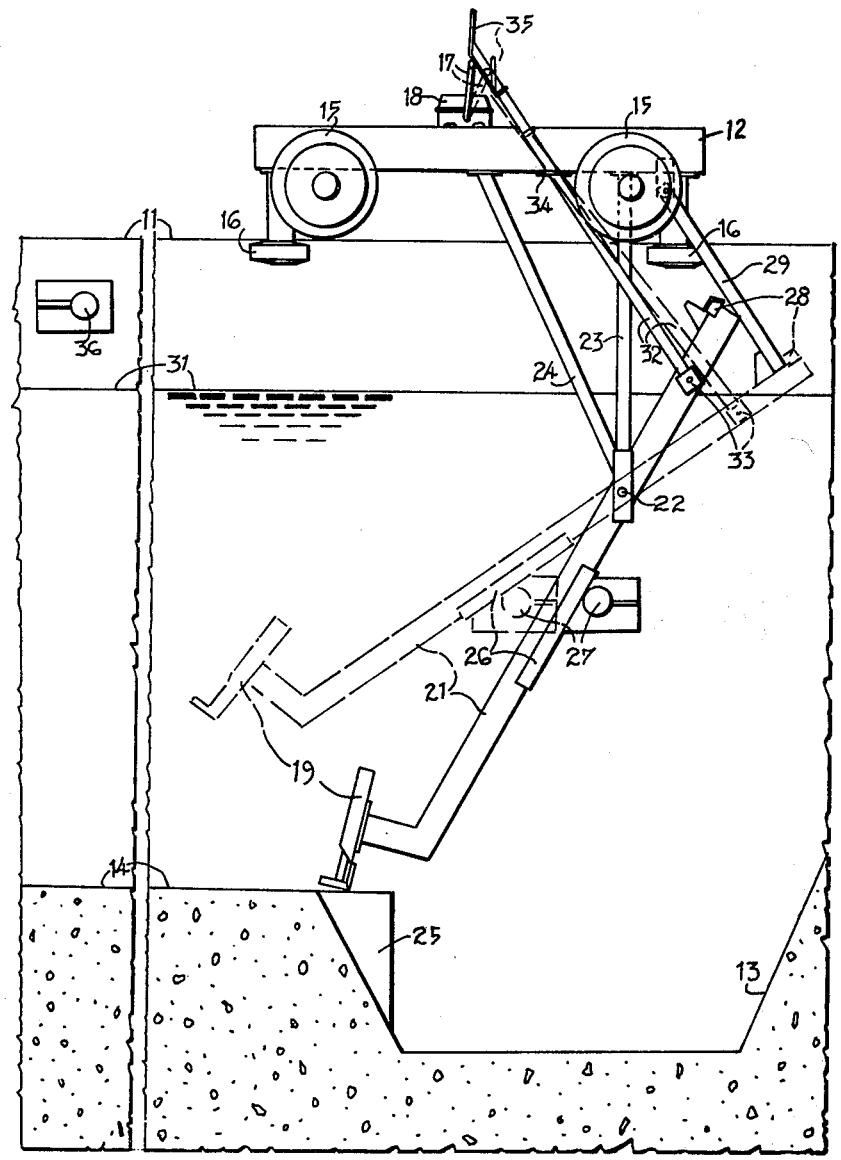
FIG. 1 is a side elevational view of a bridge-type sludge collector unit according to one preferred embodiment of the invention, showing the unit approaching the sludge well end of a clarification tank, which is depicted in cross section to illustrate the structure of the collector unit located within the tank.

Referring first to FIG. 1 of the drawings, the depicted clarification tank 11 and movable bridge 12 are typical of known systems of this type and correspond generally to the same structures shown in other accompanying drawings. As previously described, the tank is of generally rectangular elongate configuration and it includes a sludge trough 13 at one end thereof below the level of the substantially flat tank floor 14. The bridge spans the tank and is movably carried by support wheels 15 riding along the top edges of the side walls thereof; with guide wheels 16 being adapted to contact the inner surfaces of the tank walls to restrict the lateral movement of the bridge. Various means, not shown, may be employed to move the bridge along the tank in either direction, preferably by imparting tractive torque to the bridge support wheels. Regardless of the means employed for this purpose, however, the movement of the bridge in this particular embodiment is controlled by lever 17 of control device 18 to cause the bridge to move forwardly toward the sludge trough end of the tank whenever the lever is positioned as shown in solid lines and rearwardly toward the opposite end of the tank whenever the lever is in the position shown in phantom lines.

Although only two support wheels and guide wheels are visible in the drawings, it should be apparent that both the bridge and the blade supporting and operating structure comprise two sets of the illustrated components in allochiral relation to each other adjacent opposite side walls of the tank. Accordingly, reference in a plural sense to an element shown only once in the corresponding drawing will be understood to imply such duplication of that element.

The sludge collector blade 19 extends across the tank and is provided with support arms 21 pivotally attached at pivot 22 to rigid support bars 23 and 24 extending downwardly from the bridge. During the forward movement of the bridge, the blade is positioned as shown in solid lines and is dragged along the floor of the tank, thereby moving the accumulated sludge toward the sludge trough. As the blade approaches the end of its forward movement, it partially spans the sludge trough while supported at its opposite ends by floor projections 25 adjacent the tank walls, thus allowing the collected sludge to drop into the trough. Concurrently, the continuing forward movement of the bridge moves abutment shoes 26 on support arms 21 into contact with stationary lifting members 27 attached to the side walls of the tank, thus causing the blade support arms to be cammed to the position shown in phantom lines to raise the blade out of contact with the tank floor. For simplicity, the raised position of elements 19, 21, 26, 28 and 32 is shown while holding the bridge 12 stationary; and to do this it is necessary to move element 27 to the left from its solid line position.

In practice, however, element 27 is stationary at its solid line position and the members 19, 21, 26, et cetera, are raised by movement of the bridge 12 to the right (FIGURE 1) relative to its position as now shown in FIGURE 1. At their upper ends, the support arms are provided with seating members 28 adapted to receive the lower ends of pivotally mounted latch members 29 to releasably retain the blade in its raised position as shown in phantom lines. It should be noted that the seating members and the lower ends of the latch members cooperating therewith are at all times positioned above the level of the liquid in the tank, as shown at 31, thereby preventing sediment within the tank from interfering the proper operation of the latch mechanism.

To control the direction of movement of the bridge in accordance with the position of the sludge collector blade, a shifter bar 32 is pivotally attached to one of the support arms 21 by pivot pin 33 and is slidably supported by guide member 34. A cam shoe 35 is provided at the top end of the shifter bar in contact with control lever 17, which is biased toward the cam shoe by resilient means not shown. Accordingly, whenever the blade is lowered, the control lever is displaced by the cam shoe, as shown in solid lines, to produce forward movement of the bridge; whereas the upward movement of the blade to its latched position effects rearward movement of the bridge by lowering the shifter bar to allow the lever to assume the position shown in phantom lines.

When the rearward movement of the bridge has carried the raised sludge collector blade to a position adjacent the end of the tank opposite the sludge trough, latch members 29 encounter trip members 36 affixed to the tank walls, and are thereby pivoted out of latching engagement with support arms 21 by the movement of the bridge. Thereupon, the collector blade drops to the floor of the tank by pivoting the support arms back to the position shown in solid lines, thus displacing lever 17 to reestablish forward movement of the bridge.

From the foregoing description, it will be obvious that the bridge automatically moves alternately from one end of the tank to the other, with the blade in contact with the tank floor during its forward movement and raised above the tank floor during its rearward movement; such movement of the bridge being positively coordinated with the position of the blade. In the illustrated embodiments of the invention this coordination is accomplished through direct operation of the bridge control device by the blade support means. However, even if the direction of movement of the bridge were regulated by other control means responsive to the arrival of the bridge itself at predetermined locations adjacent the respective ends of the tank, accidental damage to the mechanism could be prevented in a similar manner by incorporating the device 18 in series with such other control means to disable the latter in the event of malfunctioning of the blade positioning means.

Figure 2:
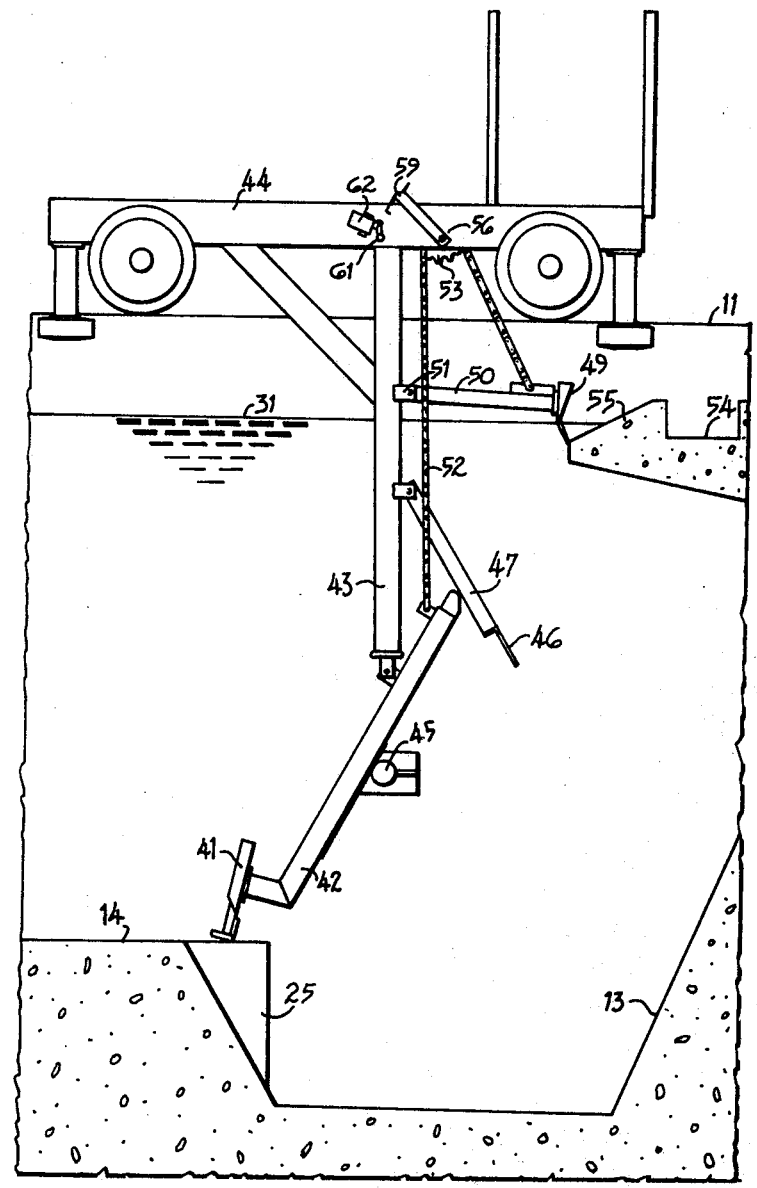
FIG. 2 corresponds to FIG. 1 and shows an alternate embodiment of a bridge-type sludge collector unit including a skimmer device movable in coordination with the vertical movement of the sludge collector blade, such unit likewise being illustrated as it approaches the sludge well end of the tank.
Figure 3:
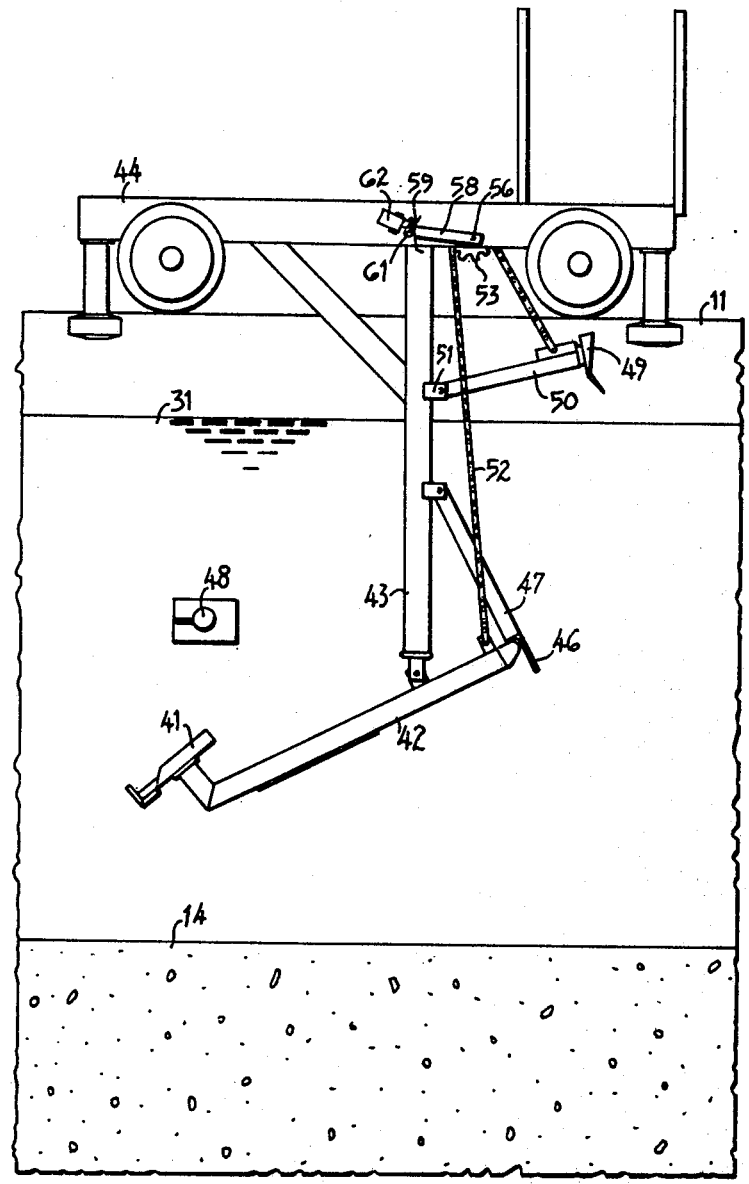
FIG. 3 corresponds to FIG. 2 and illustrates the depicted sludge collector unit approaching the end of the clarification tank opposite the sludge well.

The embodiment of the invention illustrated in FIGS. 2 and 3 is generally similar to the one just described, comprising a sludge collector blade 41 provided with support arms 42. These support arms are pivotally attached to rigid support bars 43 depending from movable bridge 44 and are adapted to engage lifting members 45 to raise the blade upon arrival of the bridge at the sludge trough end of the tank. In this construction, however, the blade is retained in its raised latched position by the reception of the upper ends of the blade support arms 42 in seating members 46 of pivotally mounted latching bars 47, which are located entirely below the liquid contained within the tank. Upon arrival of the bridge at the sludge trough end of the tank, latching bars 47 move into engagement with trip members 48 shown in FIG. 3, thereby effecting movement of the blade to the floor of the tank. This latch arrangement is particularly suitable for use in cold climates in which movable elements of the latch structure above the liquid might otherwise be jammed by ice. To achieve this advantage, however, the latch mechanism is necessarily subjected directly to the sewage being processed. Accordingly, the seat members of the latch bars are inverted relative to those shown in FIG. 1 to prevent interference with the operation of the latch mechanism by the settling of sediment onto the operative surfaces of the seating members.

In addition to the sludge collector blade, the embodiment of the invention depicted by FIGS. 2 and 3 also includes a skimmer blade 49 pivotally attached to support arms 50 to bracket members 51 on rigid support arms 43. By this arrangement, the skimmer blade is movable between a lowered position shown in FIG. 2 and a raised position shown in FIG. 3. The position of the skimmer blade is established by a roller chain 52 passing over a rotatable sprocket 53 to connect the skimmer blade operatively with the sludge collector blade. Hence, when the sludge collector blade is lowered during forward movement of the bridge, the skimmer blade is similarly lowered as shown in FIG. 2 to skim accumulated scum off the top surface of the liquid and to deposit it in scum trough 54 by riding up the inclined ramp surface 55 thereof. When the sludge collector blade is raised at the completion of the forward movement of the bridge, the roller chain likewise raises the skimmer blade as shown in FIG. 3, thus maintaining it above the level of the liquid during the rearward movement of the bridge.

Figure 4:
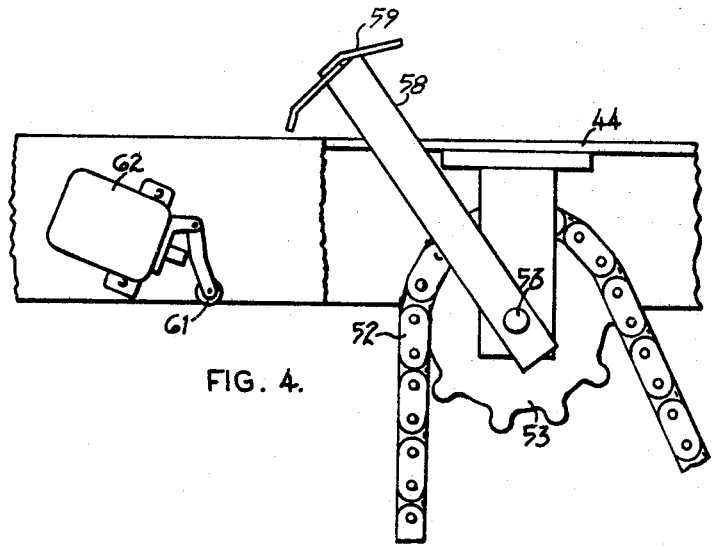
FIG. 4 is an enlarged view of a portion of FIG. 2 illustrating the switch operating mechanism used for controlling the direction of movement of the bridge in response to movement of the sludge collector blade.
Figure 5:
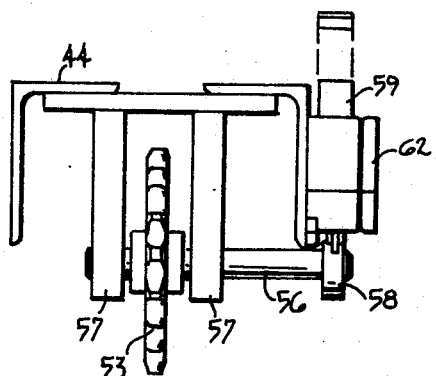
FIG. 5 is an end elevational view of the structure illustrated in FIG. 4.

As shown in FIGS. 4 and 5, sprocket 53 is rigidly attached to shaft 56, which is rotatably supported to the bridge structure by appropriate bearings 57. An arm 58 is attached to one end of shaft 56 and is provided with a cam shoe 59 adapted to engage roller member 61 of control switch 62. This switch causes the bridge to move forwardly while the roller is in the position shown in FIGS. 2, 4 and 5 and rearwardly as long as the roller is displaced toward the control switch by the cam shoe as shown in FIG. 3. Consequently, by adjusting this mechanism so that the chain moves cam shoe 59 into operating engagement with roller 61 whenever the sludge collector blade assumes its raised latched position, the movement of the bridge is controlled as a function of the position of the blades in a manner generally analogous to that described in connection with FIG. 1.

We claim:

1. In a clarification system including:
  (a) a liquid receiving tank having a generally horizontal floor,
  (b) a bridge member movable horizontally along said tank,
  (c) a collector member attached to said bridge member by collector support means and movable within said tank by movement of said bridge member,
  (d) drive means operable to move said bridge member and thereby said collector selectively in either of two opposite directions,
  the improvement comprising
  (e) collector raising means operatively cooperable with said collector member at a first location along said tank to displace said collector member vertically to a raised position above said floor,
  (f) retention means operatively connected to said bridge for movement therewith along said tank for releasably retaining said collector member in said raised position,
  (g) collector lowering means operatively cooperable with said retention means at a second location along said tank to lower said collector member from said raised position to a lowered position immediately adjacent said floor, and
  (h) control means including coordinating means for positively coordinating the direction of operation of said drive means with the vertical raised or lowered position of said collector member such that said drive means is drivable in one of said directions when the collector member is in its raised position and in the other of said directions when the collector member is in its lowered position.

2. The invention defined by claim 1 in which said collector raising means comprises immovable abutment means operatively engageable by said collector support means at said first location to translate horizontal movement of said bridge member toward said abutment means into vertical movement of said collector member from said lowered position to said raised position.

3. The invention defined by claim 1 in which said support means comprises a support arm attached to said collector member and pivotally connected to said bridge member, said retention means comprising a movable latch member defining a seating element releasably engageable with said support arm to releasably retain the latter at an angular position at which said collector member is thereby supported at said raised position.

4. The invention defined by claim 3 including pivot means pivotally attaching said latch member to said bridge member, said pivot means and said seating element being located at all times above the uppermost level of liquid received by said tank.

5. The invention defined by claim 3 in which said seating element defines engagement surfaces operatively engageable with said support arm and adapted to be submerged in liquid received by said tank, said engagement surfaces facing generally downwardly at all times to preclude precipitating materials within said liquid from accumulating on said surfaces.

6. The invention defined by claim 1 in which said control means includes a switch device adjustable to
  (a) a first condition in which said drive means is thereby operated to move said bridge member horizontally along said tank in a preselected one of said two opposite directions, and to
  (b) a second condition in which said drive means is thereby operated to move said bridge member horizontally along said tank in the other of said two opposite directions,
said coordinating means including means for adjusting said switch device to
  (a) said first condition in response to the presence of said collector member at said raised position and to
  (b) said second condition in response to the presence of said collector member at said lowered position.

7. In a clarification system including:
  (a) a liquid receiving tank having a generally horizontal floor,
  (b) a bridge member movable horizontally along said tank,
  (c) a collector member attached to said bridge member by collector support means and movable within said tank by movement of said bridge member,
  (d) drive means operable to move said bridge member and thereby said collector selectively in either of two opposite directions,
  the improvement comprising
  (e) collector raising means operatively cooperable with said collector member at a first location along said tank to displace said collector member vertically to a raised position above said floor,
  (f) retention means for releasably retaining said collector member in said raised position,
  (g) collector lowering means operatively cooperable with said retention means at a second location along said tank to lower said collector member from said raised position to a lowered position immediately adjacent said floor, and
  (h) control means including coordinating means for coordinating the operation of said drive means with the position of said collector member to disable said drive means from moving said bridge member in a predetermined one of said opposite directions in response to the presence of said collector member at a predetermined one of said raised and lowered positions, (i) said support means comprising a support arm attached to said collector member and pivotally connected to said bridge member, said retention means comprising a movable latch member defining a seating element releasably engageable with said support arm to releasably retain the latter at an angular position at which said collector member is thereby supported at said raised position.

8. The invention defined by claim 7 including pivot means pivotally attaching said latch member to said bridge member, said pivot means and said seating element being located at all times above the uppermost level of liquid received by said tank.

9. The invention defined by claim 7 in which said seating element defines engagement surfaces operatively engageable with said support arm and adapted to be submerged in liquid received by said tank, said engagement surfaces facing generally downwardly at all times to preclude precipitating materials within said liquid from accumulating on said surfaces.

References Cited

FOREIGN PATENTS 733,825    7/1955    Great Britain.

JAMES L. DECESARE, Primary Examiner

U.S. Cl. X.R.

210—527